United States Patent Office 3,248,010
Patented Apr. 26, 1966

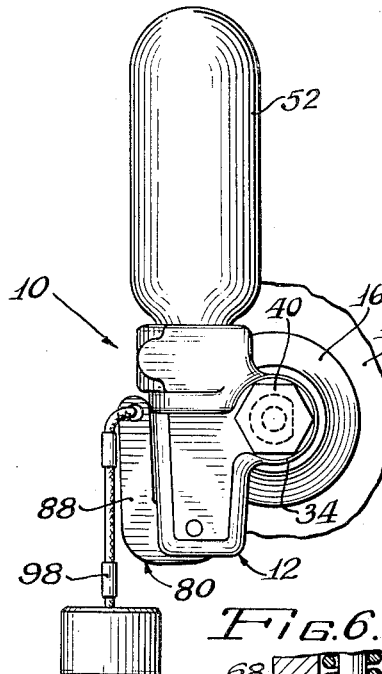
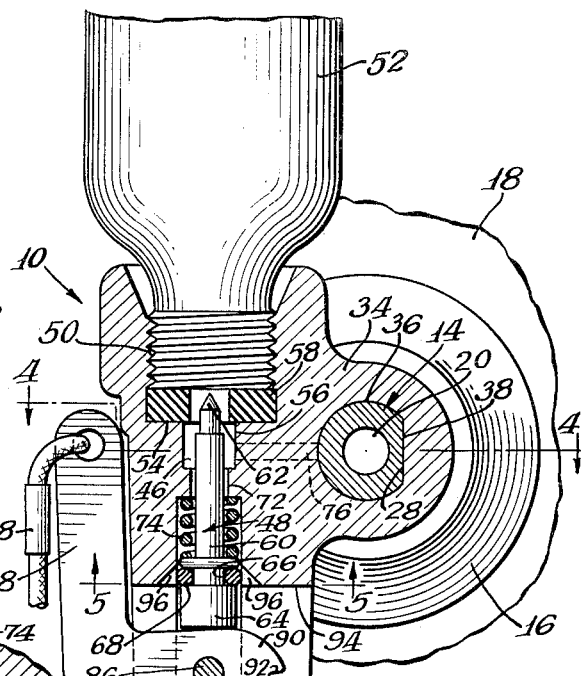
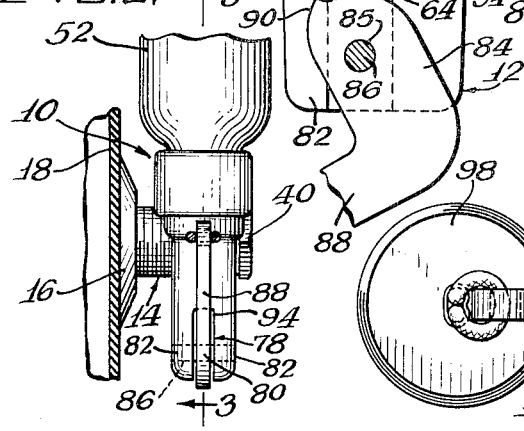
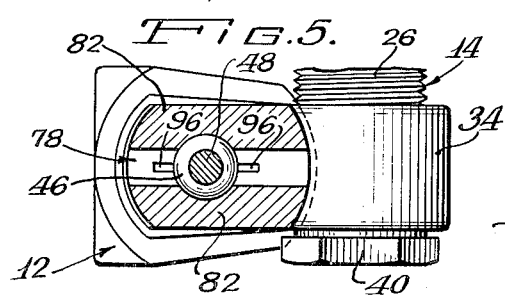

3,248,010
INFLATOR WITH VENT MEANS
Albert de Boer, St. Louis, Mo., assignor to Knapp-Monarch Company, a corporation of Delaware
Filed Dec. 16, 1963, Ser. No. 331,001
3 Claims. (Cl. 222—5)

This invention relates to an inflator valve for introducing gas to inflatable equipment, and it particularly relates to an inflator device for releasing gas to inflatable life-saving equipment, wherein vent means are provided for allowing the escape of gas from the inflatable equipment, prior to the inflation thereof.

In modern aircraft, and particularly military aircraft, pilots must depend upon pressurized suits and helmets for survival at extremely high altitudes, rather than upon a pressurized cabin. Pilots are ordinarily equipped with life jackets or preservers which are inflatable by release of gas from a pressurized gas cylinder, following the piercing or puncturing thereof by a mechanical inflation means. Before the pilot straps on the life jacket, the jacket is desirably voided of air simply by atmospheric pressure acting against the deflated equipment. However, at extremely high altitudes, where atmospheric pressure is very low, small amounts of air that might be trapped in the life jacket cause partial inflation of the vest or jacket, thereby causing discomfort to and restriction of movement of the pilot.

One device which solves this problem, is described in U.S. Patent No. 3,064,287. In this device, the inflatable equipment may be inflated either by means of a pressurized gas cylinder or by oral inflation and therefore, two completely separate gas inlets are provided in the wall of the inflatable equipment. In the patented device, in order to void the life jacket of air when subjected to low exterior pressures, the oral inflation valve is maintained in a normally open condition whereby air is voided therethrough. Thus, the vent means in the patented device requires both a pressurized gas inlet and an oral inflation inlet. Since under many conditions, the oral inflation device and inlet are not needed or required, it would be highly desirable to provide vent means integral with a pressurized gas inflator device, wherein an oral inflator is not provided.

It is therefore an important object of this invention to provide vent means for a device for releasing gas to inflatable equipment, wherein the vent means is integral with the means utilized for piercing a pressurized gas cylinder, no oral inflation device being mounted on the inflatable body.

It is a further object of this invention to provide an inflator valve, wherein the interior of the inflatable equipment is normally maintained open to the atmosphere, but which is sealed substantially simultaneously with the release of gas from the pressurized gas cylinder.

It is a further object of this invention to provide an inflator with integral vent means, which is sealed as the cartridge is pierced, and wherein means are provided for maintaining the vent means in a sealed condition as long as it is desired to maintain the life-saving equipment in the inflated condition.

It is a further object of this invention to provide an inflator valve with integral vent means, which is characterized by its simplicity and economy of construction and manufacture.

Further purposes and objects of this invention will appear as the specification proceeds.

A particular embodiment of the present invention is illustrated in the accompanying drawings wherein:

FIGURE 1 is a front elevational view of my inflator valve with integral vent means;

FIGURE 2 is a fragmentary, side elevational view of the inflator valve of FIGURE 1;

FIGURE 3 is an enlarged, partially sectioned view taken along the line 3—3 of FIGURE 2;

FIGURE 4 is a sectional view taken along the line 4—4 of FIGURE 3;

FIGURE 5 is a sectional view taken along the line 5—5 of FIGURE 3; and

FIGURE 6 is a fragmentary view showing the relationship between the driving lever and the piercing pin after actuation of the inflator device.

Referring to the drawings, my inflation device 10 is provided with a valve body 12 which is fixedly secured to a tubular stud 14. The stud 14 includes exterior threads 26 which provide for gripping threadable attachment thereof to an annular flange 16, which may be constructed of rubber, rubberized fabric of the like. Thus, the flange 16 provides means for attaching the inflator 10 to the apertured wall 18 of the inflatable appliance or equipment.

The stud 14 has a central bore 20 which communicates with the interior of the life-saving equipment through an opening 22 in the wall 18 of the equipment. The stud 14 also has an annular shoulder 24, intermediate the ends of the stud 14 and adjacent the threaded portion 26 of the stud 14. The portion of the stud 14 which is located between the shoulder 22 and the outermost end of the stud 14 is desirably of a non-circular form, and is provided with a flattened surface 28, as most clearly seen in FIGURE 3. The stud 14 is also threaded at its outer end 30. The wall of the stud 14 between the shoulder 24 and the threaded outer end 30 includes a pair of transverse apertures 32 extending from the central bore 20 and terminating at the outer surface of the stud 14.

The valve body 12, desirably constructed of a light-weight metal such as aluminum, is provided with a sidewardly projecting boss 34 having an opening 36 thereon, which is transverse to the longitudinal axis of the valve body 12 and is adapted to receive the stud 14. The non-circular opening 36 corresponds closely in cross-section to the non-circular, unthreaded portion of the stud 14, and is provided with a flat surface 38 which cooperates with flattened surface 28 on tubular stud 14, to thereby prevent relative rotation between the stud 14 and valve body 12. The valve or actuator body 12 is held on the stud 14 by a cap member 40 which is threadably secured to the threaded outer end 30 of the stud 14. Gaskets 42 are located in the annular recesses 44, provided at the opposite ends of the transverse opening 36 of the valve body 12. The cap 40 is tightened on the stud 14, whereby one of the gaskets 42 is squeezed in one recess 44 against the shoulder 24, and the other of the gaskets 42 is squeezed within the other of the recesses 44 against the annular base of the cap member 34, to thereby provide a pressure tight seal between the stud 14 and the valve body 12.

The valve body 12 is provided with an elongated, axial central bore 46 which is adapted to slidably receive a piercing pin member 48. One end of the bore 46 terminates with an internally threaded portion or socket 50 of increased diameter; the socket 50 is adapted to threadably receive a gas cylinder or cartridge 52. The pressurized cylinder or cartridge 52 contains a pressurized gas, such as $CO_2$. An annular recess 54, located between one end 56 of the elongated bore 46 and the threaded socket 50, is adapted to receive a gasket 58, which prevents the escape of gas at the threaded connection between the valve body 12 and the gas cylinder 52.

The piercing pin 48 is slidably positioned in the bore 46 and includes a shank 60 having a pointed upper end 62, which is adapted to pierce or project through the end of the pressurized cylinder 52, to thereby effect the release of gas therefrom. The pin 48 is also provided with a cylindrical lower portion or head 64 which slidably moves within the central bore 46; the head 64 includes a peripheral groove 66 therein, which is adapted to receive an O-ring or sealing member 68, which is provided for preventing the escape of gas from the inflatable equipment after the pin 48 has released gas from the cylinder 52.

Intermediate the opposite ends of the bore 46, there is a restricted portion 72 which provides a seat for the lower end of the compression spring 74, the opposite end of the spring 74 abutting the annular end of the head 64 of the pin 48, whereby the pin 48 is normally biased away from the piercable end of the cylinder 52, but is maintained in close proximity thereto. Following the upward piercing movement of the pin 48 to release gas from the cylinder 52, gas passes through the upper end of the central bore 46 and then through the outwardly angled conduits or ports 76 in the wall of the valve body 12; the released gas then passes into the transverse apertures 32 in the wall of the tubular stud 14 and through the central bore 20 to the interior of the inflatable body, whereby the gas causes the inflation thereof.

At the lower end of the valve body 12, which is opposite to the end adjacent the threaded socket 20, a slot 78 is provided. The longitudinal dimension of the slot 78 is positioned transverse to the tubular stud 14, and is adapted to receive the flat lever member 80 between the walls 82 thereof. The L-shaped lever 80 has a lower arm 84 movably positioned within the slot 78, the arm 74 being provided with central aperture 85 for providing pivotable connection with the pivot pin 86. The pivot pin 86 is mounted on the walls 82, which form the sides of the groove 78, and is positioned substantially parallel to the tubular stud 14, whereby the lever arm 84 is pivotable in a plane substantially parallel to the wall 18 of the inflatable equipment and in a direction transverse to the tubular stud 14. The upstanding leg 88 of the lever arm 84 is desirably maintained in close proximity to the outer surface of the valve body 12. The upper portion of the arm 84 of the lever 80 includes a camming portion 90 which abuts the lower end of the head 64 of the piercing pin 48; thus the positioning of the lever 80 in the slot 78 not only prevents ejection of the pin 48 from the bore 46 by the spring 74, but upon pivoting of the lever 80, the camming portion 90 drives the pin 48 upwardly and into piercing engagement with the gas cartridge 52, to thereby effect the release of gas therefrom.

The arm 84, at its outer end, is also provided with a stepped projection or stop portion 92 which, after pivoting the lever 80 a full 90°, is adapted to engage a corner of the head 64, so as to maintain the pin 48 above the venting notches or slots 96 and to maintain the O-ring 68 in sealing engagement with the inner walls of the central bore 46, thereby preventing the escape of gas from the inflatable body following inflation thereof.

Adjacent the base 94 of the slot 78, there is provided a pair of opposed, inwardly inclined passageways or slots 96; these slots, preferably inclined at about a 45° angle, provide communication between the central bore 46 and the atmosphere, thereby providing vent means for the inflatable body.

When the inflator device 10 is in the non-actuated position, the O-ring sealing member 68 is in general alignment with the inclined slots or vents 96, whereby air escapes from the inflatable equipment, through the bore 20 of the stud 14, through the bore 36 of the valve body 12, and then out to the atmosphere through the vents 96; this escape of air occurs when extremely low exterior pressures are encountered by aircraft flying at high altitudes. Thus, a pilot is assured that he will not be hampered in his operations by a partial inflation of his life jacket. When the life jacket is needed, the pilot merely pulls the lanyard 98, to thereby pivot the lever 80 through approximately 90° and drive the pin 48 into the piercable end of the cylinder 52. During this operation, the O-ring 68 moves out of alignment with the venting slots 96 and comes into sealing engagement with the inner walls of the central bore 46 to thereby prevent further escape of gas through the venting notches or slots 96. The pin 48 is held in this position by the locking portion 92 of the lever 80, whereby the life preserver is maintained in the inflated condition.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. A device for releasing gas to inflatable equipment from a pressurized gas cylinder, said device comprising in combination: a valve body having an elongated central bore, means at one end of said bore for receiving said gas cylinder, a pair of spaced walls at the other end of said bore defining a slot therebetween which communicates to atmosphere, inclined venting notches at the other end of said bore communicating with said slot for providing communication between said bore and the atmosphere, an outlet port positioned intermeidate the ends of said bore for providing commnuication between said bore and said inflatable equipment, a pin slidably positioned within said bore for piercing said cylinder for releasing pressurized gas therefrom, and sealing means positioned on said pin, said sealing means, prior to the piercing of said gas cylinder, being positioned beyond the point of communication of said venting notches with said central bore, whereby air escapes from said equipment to the atmosphere through said venting notches, and following the piercing of said cylinder, being positioned in said bore intermediate said venting notches and said outlet port, whereby escape of gas from said cyilnder is prevented by sealing engagement between said sealing means and said bore.

2. The device of claim 1 wherein means are provided for driving said pin into said cylinder for the release of gas therefrom, said means including locking means for holding said sealing means intermediate said venting notches and said outlet port, to thereby prevent the escape of gas from said device following the inflation of said equipment.

3. An improved inflator for selectively releasing gas from a sealed pressurized gas cylinder for inflating inflatable equipment, said inflator comprising in combination: a valve body having an elongated central bore, means at one end of said bore for receiving said gas cylinder, a pair of spaced walls at the opposite end of said bore defining a slot that is open to atmosphere therebetween, an outlet port in said valve body communicating with said bore intermediate its ends and through which gas may pass to and from the inflatable device, a piercing pin slidable within said bore and adapted to pierce the cylinder to release gas therefrom, a lever positioned in said slot between said pair of walls for manually driving said piercing pin in a direction to pierce the cylinder, a venting notch at said opposite end of the bore in the plane of and communicating with the said slot between said pair of walls to provide communication between said bore and atmosphere, and sealing means on said pin normally positioned in general alignment with said venting notch to permit air to escape from said inflatable equipment to the atmosphere through the venting notch and said slot, and after piercing said cylinder, said sealing means being positioned in said bore intermediate said venting notch and said outlet port to prevent escape of gas through said venting notch.

References Cited by the Examiner

UNITED STATES PATENTS 3,169,665  2/1965  Colley _____ 222—5

RAPHAEL M. LUPO, *Primary Examiner.*

EVERETT W. KIRBY, *Examiner.*

N. L. STACK, *Assistant Examiner.*